(12) United States Patent
Harvey et al.

(10) Patent No.: US 9,605,672 B2
(45) Date of Patent: Mar. 28, 2017

(54) RECIPROCATING-ROD SEAL

(71) Applicant: Parker-Hannifin Corporation, Cleveland, OH (US)

(72) Inventors: Lee L. Harvey, Rockwell, TX (US); Kenneth R. Albertson, Huntsville, UT (US); Gary W. Schroeder, West Valley City, UT (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/606,349

(22) Filed: Jan. 27, 2015

(65) Prior Publication Data

US 2015/0233371 A1 Aug. 20, 2015

Related U.S. Application Data

(63) Continuation of application No. 12/241,674, filed on Sep. 30, 2008, now abandoned.
(Continued)

(51) Int. Cl.
| | |
|---|---|
| *F16J 15/3252* | (2016.01) |
| *F16J 15/3232* | (2016.01) |
| *F04B 53/14* | (2006.01) |
| *B29C 45/14* | (2006.01) |
| *F16J 9/28* | (2006.01) |

(Continued)

(52) U.S. Cl.
CPC ...... *F04B 53/143* (2013.01); *B29C 45/14065* (2013.01); *B29C 45/14336* (2013.01); *B29C 45/14549* (2013.01); *B29C 45/1671* (2013.01); *F16J 9/28* (2013.01); *B29C 2045/1495* (2013.01); *B29C 2045/14459* (2013.01); *B29K 2075/00* (2013.01); *B29L 2009/005* (2013.01);
(Continued)

(58) Field of Classification Search
CPC ...... F16J 15/3252; F16J 15/123; F16J 15/025; F16J 15/062; F16J 15/104; F16J 15/32; F16J 15/121
See application file for complete search history.

(56) References Cited

U.S. PATENT DOCUMENTS

| 2,868,566 A | 1/1959 | Kosatka |
| 2,992,027 A | 7/1961 | Wright et al. |

(Continued)

FOREIGN PATENT DOCUMENTS

WO 2007005173 1/2007

*Primary Examiner* — Kipp Wallace
(74) *Attorney, Agent, or Firm* — Renner, Otto, Boisselle & Sklar, LLP

(57) ABSTRACT

A reciprocating-rod seal (10) comprising a one-piece rigid support (20) and a one-piece elastomeric body (30) bonded to the rigid support (20). A notch (40) separates an ID fluidside portion (41) of the elastomeric body (30) from an OD fluidside portion (42) of the elastomeric body (30), and the ID fluidside portion (41) forms a sealing lip (43). A groove (50) separates an ID airside portion (51) of the elastomeric body (30) from an OD airside portion (52) of the elastomeric body (30), and the ID airside portion (51) forms a wiping lip (53). The sealing lip (43) prevents fluid escape during forward and return strokes of a reciprocating rod, and the wiping lip (53) removes dirt, dust, or other debris from the rod during return strokes. The seal (10) can serve as the primary seal for a mudpump pony rod and/or a mudpump plunger rod.

20 Claims, 5 Drawing Sheets

Related U.S. Application Data

(60) Provisional application No. 61/023,452, filed on Jan. 25, 2008.

(51) Int. Cl.
 *B29C 45/16* (2006.01)
 *B29L 9/00* (2006.01)
 *B29L 31/06* (2006.01)
 *B29L 31/26* (2006.01)
 *B29K 75/00* (2006.01)

(52) U.S. Cl.
 CPC ....... *B29L 2031/06* (2013.01); *B29L 2031/26* (2013.01)

(56) References Cited

U.S. PATENT DOCUMENTS

| | | |
|---|---|---|
| 3,108,815 A | 10/1963 | Haynie et al. |
| 3,989,259 A | 11/1976 | Lorenz et al. |
| 4,022,349 A | 5/1977 | McMullan et al. |
| 4,026,563 A | 5/1977 | Bainard |
| 4,141,563 A | 2/1979 | Wu |
| 4,172,599 A | 10/1979 | Forch |
| 4,242,057 A | 12/1980 | Bender |
| 4,243,232 A | 1/1981 | Repella |
| 4,269,567 A | 5/1981 | Phillips et al. |
| D270,718 S | 9/1983 | Cain |
| 4,500,267 A | 2/1985 | Birdwell |
| 4,504,067 A | 3/1985 | Cather |
| 4,510,800 A | 4/1985 | Prior |
| 4,595,343 A | 6/1986 | Thompson et al. |
| 4,616,836 A | 10/1986 | Drygalski et al. |
| 4,618,153 A * | 10/1986 | Nilsson ............... F16J 15/3204 277/575 |
| 4,668,251 A | 5/1987 | Burgess |
| 4,987,826 A | 1/1991 | Deppert et al. |
| 5,146,433 A | 9/1992 | Kosmala et al. |
| 5,431,415 A | 7/1995 | Millonig et al. |
| 5,460,678 A | 10/1995 | Reinsma et al. |
| 5,616,009 A | 4/1997 | Birdwell |
| 5,664,651 A | 9/1997 | Miura et al. |
| 5,813,676 A | 9/1998 | Antonini et al. |
| 5,871,052 A | 2/1999 | Benson et al. |
| 6,045,137 A | 4/2000 | Friend et al. |
| 6,053,502 A | 4/2000 | Hallenstvedt |
| 6,116,613 A * | 9/2000 | Friend ............... F16J 15/3204 277/549 |
| 6,505,691 B2 | 1/2003 | Judge et al. |
| 6,557,857 B1 | 5/2003 | Goodman |
| 6,616,146 B2 | 9/2003 | Friend et al. |
| 6,626,437 B2 * | 9/2003 | Friend ............... F16J 15/3204 277/500 |
| 6,736,404 B1 | 5/2004 | Shuster |
| 6,904,982 B2 | 6/2005 | Judge et al. |
| 7,004,730 B1 | 2/2006 | Williams |
| 2002/0066596 A1 | 6/2002 | Judge et al. |
| 2002/0092418 A1 | 7/2002 | Hefren |
| 2003/0139916 A1 | 7/2003 | Choe et al. |
| 2003/0164592 A1* | 9/2003 | Friend ............... F16J 15/3204 277/500 |
| 2004/0007392 A1 | 1/2004 | Judge et al. |
| 2004/0119244 A1 | 6/2004 | Duke et al. |
| 2007/0261888 A1 | 11/2007 | Urquhart |
| 2008/0001362 A1 | 1/2008 | Chitren et al. |

\* cited by examiner

_US 9,605,672 B2_

RECIPROCATING-ROD SEAL

RELATED APPLICATION

This application is a continuation of U.S. Nonprovisional patent application Ser. No. 12/241,674 filed Sep. 30, 2008, which claims priority under 35 U.S.C. §119 (e) to U.S. Provisional Patent Application No. 61/023,452 filed on Jan. 25, 2008, which are all hereby incorporated herein by reference in their entirety.

FIELD

This disclosure relates to a seal for sealing the interface between a housing and a reciprocating rod extending therethrough.

BACKGROUND

In an offshore drilling operation, a drillstring extends from the rig platform into a wellbore whereat its drillbit drills deeper and deeper into the sea floor. During drilling, pumps circulate mud through the drillbit and back through the riser surrounding the drillstring. Mudpumps are usually large positive displacement pumps which generate flow by reciprocal plunger movement. In a triplex mudpump, for example, three plungers can be reciprocally driven by pony rods to suction the working fluid (e.g., mud slurry) through an inlet and discharge it through an outlet. A typical triplex mudpump could have a horsepower rating from 275 to 2000 BHP and discharge pressures from 1000 psi to 7500 psi. In offshore drilling, as well as many other industrial situations, convenient accessibility of expendable parts, such as reciprocating-rod seals, can be of the utmost importance.

SUMMARY

A seal comprises a one-piece rigid support and a one-piece elastomeric body bonded to the rigid support. The rigid support encases the elastomeric body whereby it does not extend radially or axially beyond a retaining wall. The elastomeric body forms a sealing lip that prevents fluid escape during forward and return strokes of the reciprocating rod. The elastomeric body also forms a wiping lip, that removes dirt, dust and other debris from the rod during return strokes.

In a mudpump, for example, the seal can be used to seal interfaces associated with pony rods or plunger rods. In such a mudpump application, the seal will be easily accessible for installation, inspection or replacement. Furthermore, in many mudpump situations, the seal can be the only sealing component necessary on the reciprocating rod. In other words, the seal can be the primary seal on a mudpump reciprocating rod assembly, without buffer rings and/or stronger seals within the housing.

These and other features of the seal are fully described and particularly pointed out in the claims. The following description and annexed drawings set forth in detail certain illustrative embodiments, these embodiments being indicative of but a few of the various ways in which the principles may be employed.

DRAWINGS

DESCRIPTION

Figure 1:
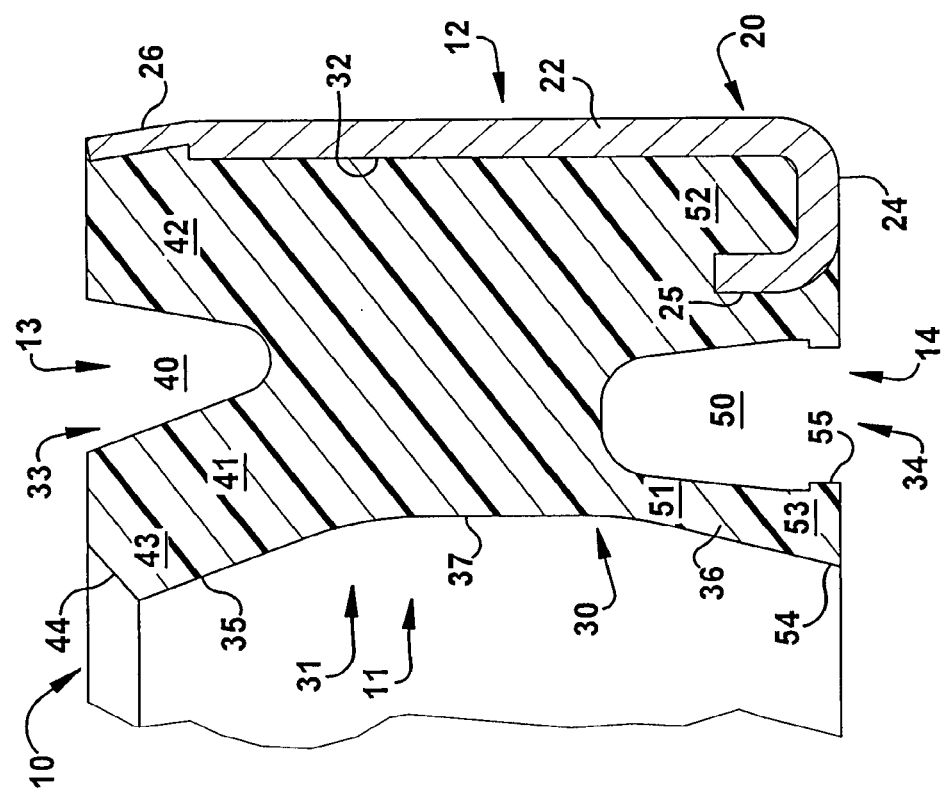
FIG. 1 is a cross-sectional view of a reciprocating-rod seal in a pre-installation condition, the seal including a rigid support and an elastomeric body.
Figure 3A:
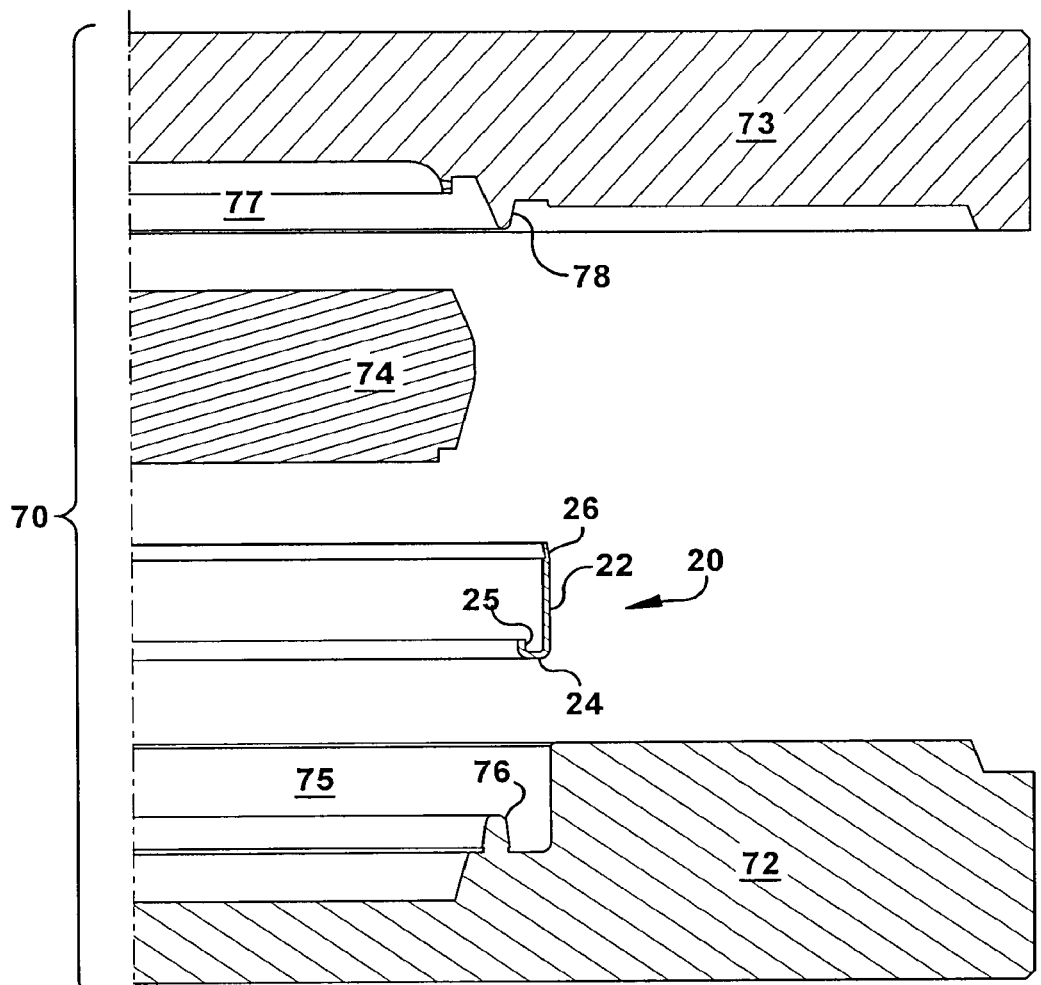
FIGS. 3A-3D are schematic views of a method of making the seal.
Figure 3B:
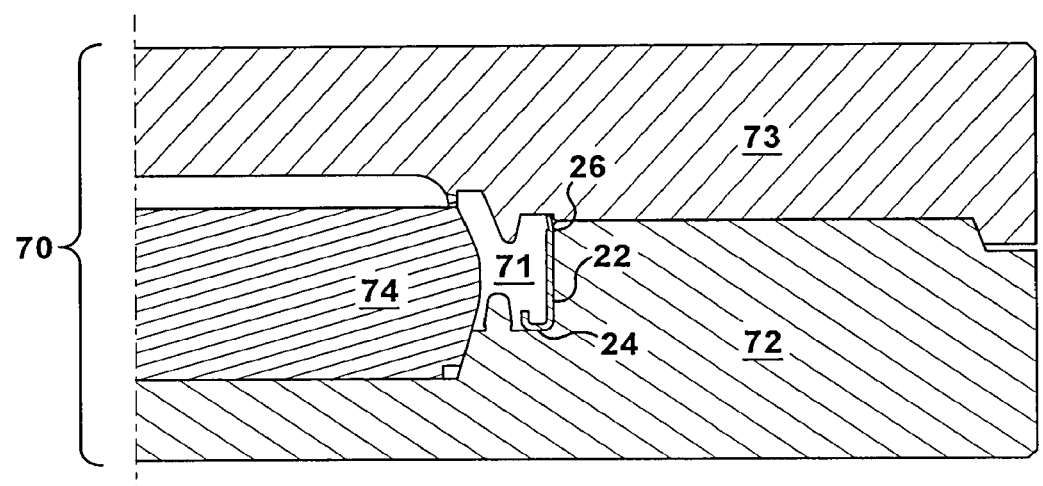
Figure 3C:
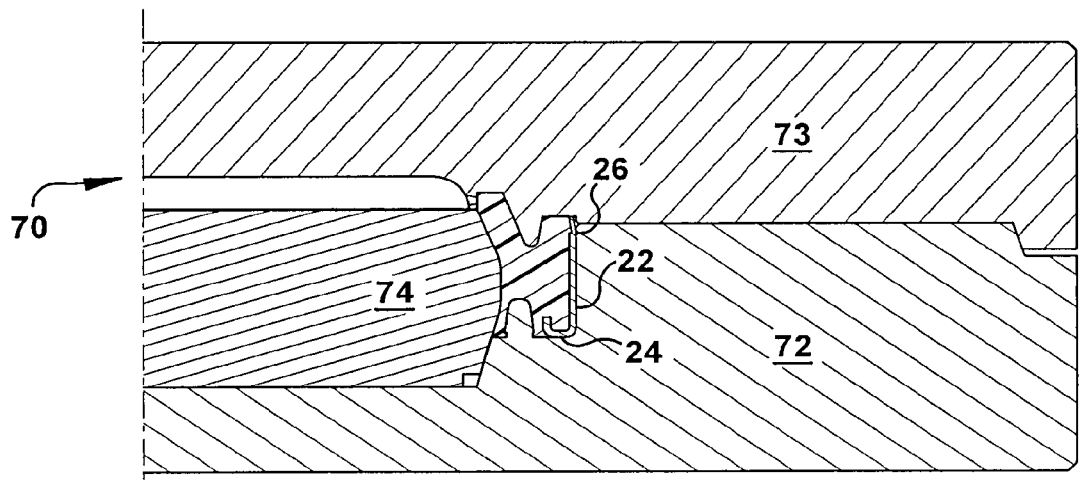
Figure 3D:
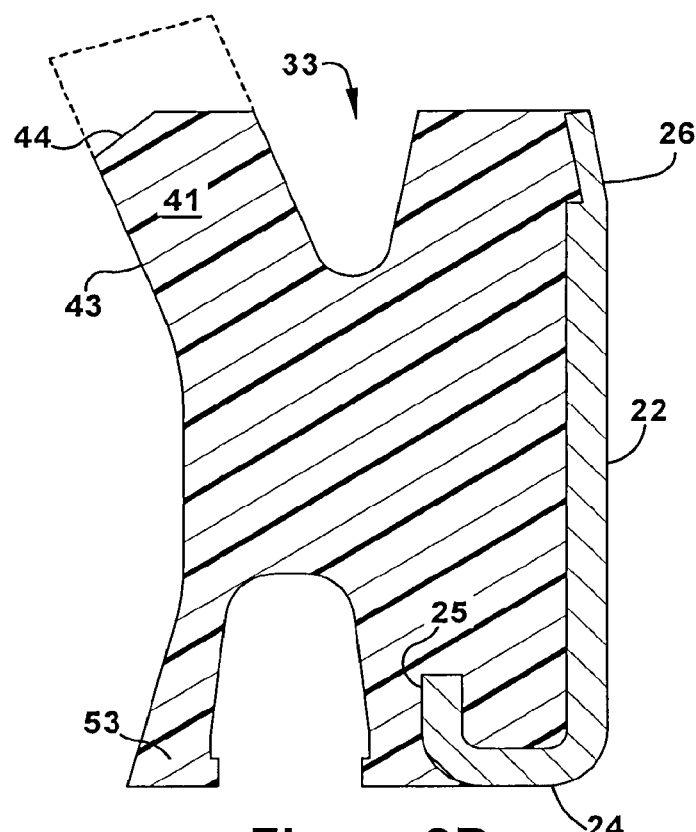

A reciprocating-rod seal 10 is shown in FIG. 1 in a pre-installation condition. The seal 10 has an inner-radial surface 11, an outer-radial surface 12, a fluidside surface 13, and an airside surface 14. The distance between the radial surfaces 11 and 12 can be considered the radial thickness of the seal 10 and the distance between the side surfaces 13 and 14 can be considered its axial length.

The seal 10 comprises a rigid support 20 and an elastomeric body 30 bonded thereto. The support-body bond, and its ability to withstand heat, pressure, and repeated reciprocal motion, may factor heavily into the life and the performance of the seal 10. Thus materials and bonding techniques may be chosen to optimize the adherence between the support 20 and the elastomeric body 30. For example, the rigid support 20 can be made of stainless steel, the elastomeric body 30 can be made of polyurethane, and bonding can be accomplished during injection molding.

The rigid support 20 can be a one-piece member that is, for example, stamped or otherwise formed from a metal sheet. The rigid support 20 comprises a cylindrical retaining wall 22, a flange wall 24, and an anchor wall 25 which collectively form a J-like cross-sectional shape. Other cross-sectional shapes are possible and contemplated. For example, the rigid support 20 could be constructed without the flange wall 24 and/or the anchor wall 25, and/or the rigid support 20 could be constructed with additional walls, flanges or anchors.

The cylindrical retaining wall 22 forms the seal's outer-radial surface 12 and, in the illustrated embodiment, the elastomeric body 30 does not extend axially or radially beyond this wall 22. The flange wall 24 extends radially inward from an airside end of the wall 22. The anchor wall 25 extends axially in the fluidside direction from the inner-radial end of the flange wall 24. The wall-to-wall transitions (i.e., the corners) can be rounded, curved, sharp, blunt or another profile compatible with the expected sealing application and intended manufacturing method.

The span of the flange wall 24 can be between 20% and 50% of the radial thickness of the seal 10, and the reach of the anchor wall 25 can be between 10% and 30% of the seal's axial length. The flange wall 24 partially forms the airside surface 14 of the seal 10 and the anchor wall 25 is embedded within the elastomeric body 30. The walls' span/reach may depend, at least somewhat, upon the geometry of a groove (namely a groove 50, introduced below), in the elastomeric body 30.

The gauge of the walls 22, 24, 25 of the rigid support 20 can be relatively small compared to the overall radial thickness of the seal 10. For example, the wall gauge will usually be in the range of 1 mm to 5 mm and/or 5% to 20% the radial thickness of the seal 10. If the support 20 is stamped or otherwise formed from sheet material, the gauges of the walls 22, 24, 25 will be approximately equal.

The fluid-side edge section 26 of the retaining wall 22 (e.g., 10% to 30% of the wall's axial length) can be thinner than the rest of the retaining wall. For example, the edge section 26 can be crimped or otherwise made thinner than the rest of the wall 22. This geometry may prove helpful, in that it can provide a predetermined bending area during support/seal insertion during installation and/or manufacture. The same could be accomplished by, for example, notching, perforating, or otherwise weakening the proximal region of the edge section 26 to form a living hinge.

The elastomeric body has an inner-radial face 31, an outer-radial face 32, a fluidside face 33, and an airside face 34. The outer-radial face 32 is encased by the cylindrical retaining wall 22 whereby, as mentioned above, the elastomeric body 30 does not extend axially or radially beyond this wall 22. The inner-radial face 31 forms the seal's inner-radial surface 11, and can include a fluidside ramp 35, an airside ramp 36, and a shallow 37 therebetween.

The fluidside face 33 forms the seal's fluidside surface 13. A notch 40 in the fluidside face 33 (and/or the seal's fluidside surface 13) separates the elastomeric body 30 into an ID fluidside portion 41 and an OD fluidside portion 42. The ID fluidside portion forms a sealing lip 43 and can include a cutoff corner 44.

The airside face 34 of the elastomeric body 30 can form the airside surface 14 of the seal 10 along with the flange wall 24 of the rigid support 20. A groove 50 in the airside face 34 (and/or the seal's airside surface 14) separates the elastomeric body 30 into an ID airside portion 51 and an OD airside portion 52. The ID airside portion 51 forms a wiping lip 53 and can include an acute corner 54. The flange wall 24 of the rigid support 20 encases part of the OD airside portion 52 and the anchor wall 25 is embedded therein. The groove 50 can also include a rim 55 around its airside edge.

In the illustrated seal 10, the notch 40 has a cross-sectional shape resembling a rounded-vertex V. And the groove 50 has a cross-sectional shape resembling a rimmed U. While such geometries will be suitable in many applications, the shape, size, and/or situating of the notch 40 and/or the groove 50 can be varied to best provide the desired sealing and wiping functions, to facilitate installation, and/or to simplify manufacture.

For example, the size, shape, and situating of the notch/groove can be selected to accommodate installation. As is explained in more detail below, the seal 10 is radially compressed during installation, and this installation compression will usually be concentrated in the ID portions 41 and 51 of the elastomeric body 30. In many seal constructions, the thicker the ID portions 42/52, the greater the compression required for seal installation. Thus, the notch/groove can be designed to insure that the required forces are reasonable for the intended seal application.

The size/shape/situating of the notch 40 and the groove 50 should also be selected to insure that the lips 43/53 can maintain constant sliding contact with the relevant reciprocating rod. In most instances, the sealing lip 43 should probably apply a greater rod-contact force than the wiping lip 53. Otherwise, the wiping lip 53 could block fluid film still on the reciprocating rod (e.g., fluid that snuck past the sealing lip 43) during forward strokes, resulting in fluid accumulation within the shallow 37, and eventual leakage therefrom. This desired rod-contact-force relationship can be accomplished by, for example, the groove 50 being wider, deeper, and/or closer (to the OD face 32) than the notch 40.

The size, shape, and/or situating of the notch 40 and/or the groove may further take into consideration the integrity of the bond between the rigid support 20 and the elastomeric body 30. For example, if an elastomer is expected to shrink after seal formation, this can cause the elastomeric OD portions 42/52 to pull away (i.e., radially inward) from the rigid retaining wall 22. If so, thinner OD portions 42/52 may be preferred to lessen this pull and thereby preserve bond integrity.

With particular reference to the groove 50, the design of the rigid support 20 may play into its size, shape, and situating. Specifically, for example, if the rigid support 20 has a flange wall 24, the groove 50 will usually need to be spaced a sufficient distance radially outward therefrom. And if the rigid support 20 has an anchor wall 25, the groove 50 may be best positioned to allow adequate embedding (and thus anchoring) of the support 20 to the elastomeric body 30.

In most intended sealing situations, a notch 40 and/or a groove 50 having a radial span (at its fluidside end) of 10% to 30% of the radial thickness of the seal 10, and a depth (in the axial direction) of about 20% to 40% of the seal's axial length, will be suitable.

Figure 2:
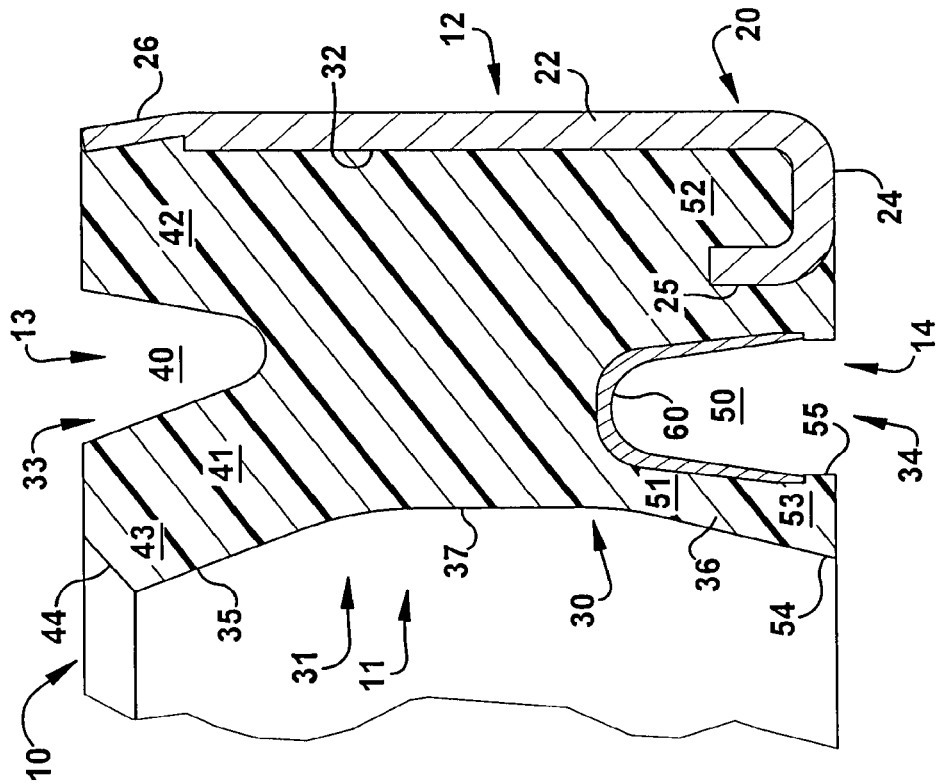
FIG. 2 is a cross-sectional view of a reciprocating-rod seal when it further includes a reinforcement member.

As shown in FIG. 2, the seal 10 can (but need not) further comprise a reinforcement member 60 lining its airside groove 50. The reinforcement member 60 can have a shape corresponding to the non-rimmed regions of the groove 50, and the rim 55 can be helpful in holding reinforcement member 60 in place prior to installation. The member 60 can comprise, for example, a folded metal sheet that functions as spring in the seal 10 and resiliently urges the airside portions 51 and 52 radially away from each other.

A method of making the seal 10 with a mold 70 is schematically shown in FIGS. 3A-3D. The mold 70 has a cavity 71 formed by mold parts 72, 73, and 74. The first mold part 72 has a channel 75 corresponding to the seal's airside face 14 (and at least some of its OD face 12) and groove-forming projection 76. The second mold part 73 has a channel 77 corresponding to the seal's fluidside face 13 (and possibly some of its OD face 12) and a notch-forming projection 78. The core part 74 has a perimeter corresponding to the seal's ID face 11 (e.g., ramp-shallow-ramp).

The rigid support 20 is inserted into the channel 75 in the first mold part, with its retaining wall 22 positioned against the channel cliff and its flange wall 24 positioned against the channel floor. Once the rigid support 20 is inserted, and the core part 74 placed in position, the second mold part 73 is placed thereover to close the cavity 71. If the retaining wall 22 includes a hinged end section 26, it can occupy the upper edge region of the channel 75, and facilitate insertion of the rigid support 20 and/or insure a tight fit upon placement of the second mold part 73.

Once the mold parts 72, 73, and 74 are compiled, an elastomer is introduced (e.g., injected) into the cavity 71. The introduced-elastomer pressure within the cavity 71 pushes the retaining wall 22 against the channel cliff and the flange wall 24 against the channel floor. The rigid retainer 20, and its positioning within the mold cavity 71, can thereby prevent the elastomer from extending axially or radially beyond the cylindrical wall 22.

After the elastomer cures and/or hardens, the mold 70 is opened and the molded piece is removed therefrom. In the illustrated embodiment, the molded piece has an OD fluidside geometry bulging beyond that of the seal 10 and it must be trimmed to form the sealing lip 43. If the molded piece has a geometry more closely mirroring that of the seal 10, such trimming may not be necessary. But one advantage of a method including a trimming step is that the ID parting line (between the upper mold part 73 and the core part 74) can be positioned above the sealing-lip location. In this manner, any ragged-flash seams caused by the parting line are removed during trimming and a smooth sharp sealing lip 43 is formed.

If the seal 10 includes a retaining member 60, it can be inserted into the groove 50 after completion of the molding and trimming steps.

Figure 4:
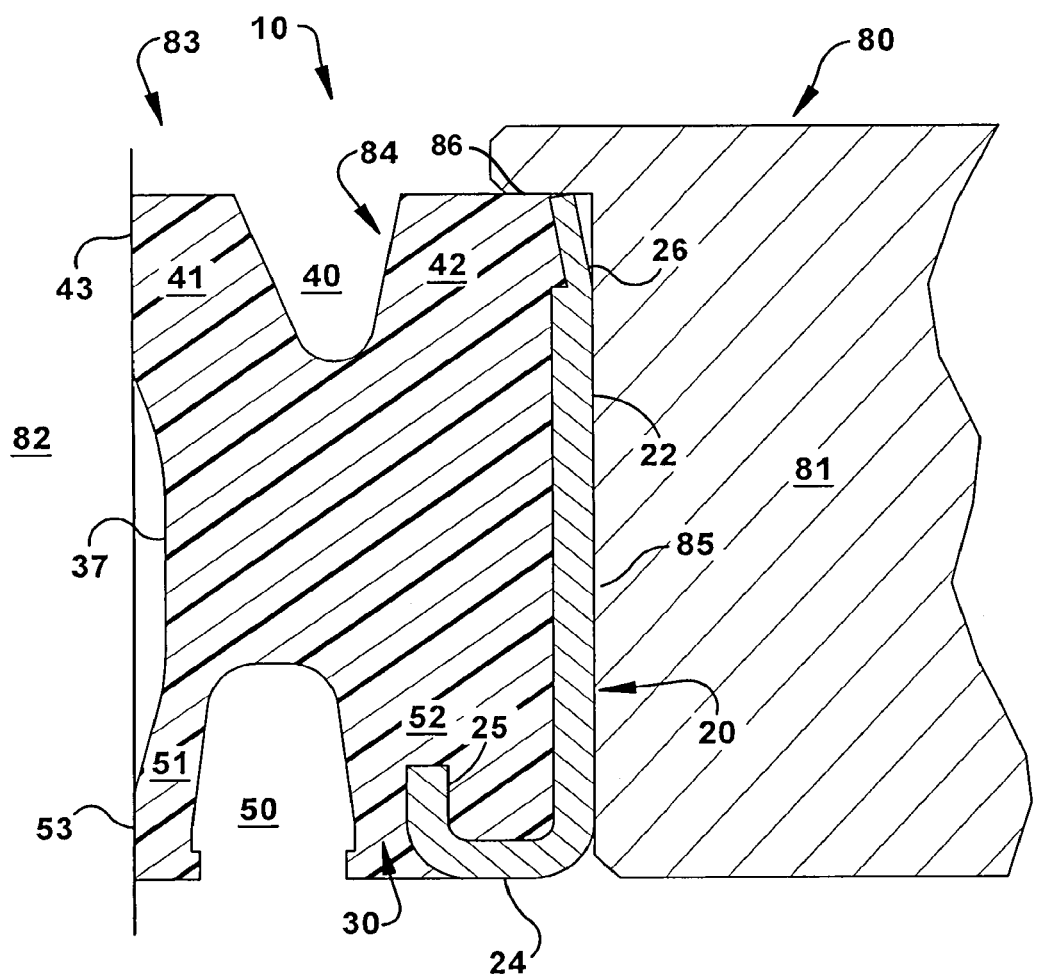
FIG. 4 is a cross-sectional view of the seal installed in a reciprocating-rod assembly.

Referring now to FIG. 4, the seal 10 is shown as part of a reciprocating-rod assembly 80 comprising a housing 81 and a rod 82 that reciprocally moves relative to the housing 81. The housing 81 comprises an opening 83 through which the rod 82 extends and a pocket 84 surrounding the opening 83. The pocket 84 has a floor 85 and a ledge 86 extending radially inward from the floor's fluidside end.

When the seal 10 is installed in the pocket 84, its cylindrical retaining wall 22 abuts against the pocket's floor 85. If the retaining wall 22 has a hinged end section 26, this may aid in press-fitting the rigid support 20 into the pocket 84 during seal installation. The ledge 86 can preferably project beyond the wall end section 26 so that the OD fluidside portion 42 can lie flush thereagainst.

The radial distance between the pocket floor 85 and the rod 81 is less than the seal's thickness, and the ID portions 41 and 51 are compressed to fit within this smaller space. The corners 44 and 54 are flattened by this compression and the lips 43 and 53 slidingly contact the rod 81. More specifically, the fluidside ramp region 35 of the ID face 31 forms a rod-contacting region of the sealing lip 43 and the airside ramp region 36 forms a rod-contacting region of the wiping lip 53. The shallow 37 between the ramp regions is not a rod-contacting region. As was explained above, it may be important in many instances that the sealing lip 43 apply a greater contract force against the rod 81 than the wiping lip 53.

In operation of the assembly 80, the rod 82 moves in a reciprocal manner with forward strokes away from the housing 81 and return strokes back towards the housing 81. During forward and return strokes, the sealing lip 43 seals the housing-rod interface and prevents fluid from escaping from the housing 81. During return strokes, the wiping lip 53 removes (e.g., wipes) dirt, dust, and other debris from rod 82.

Figure 5:
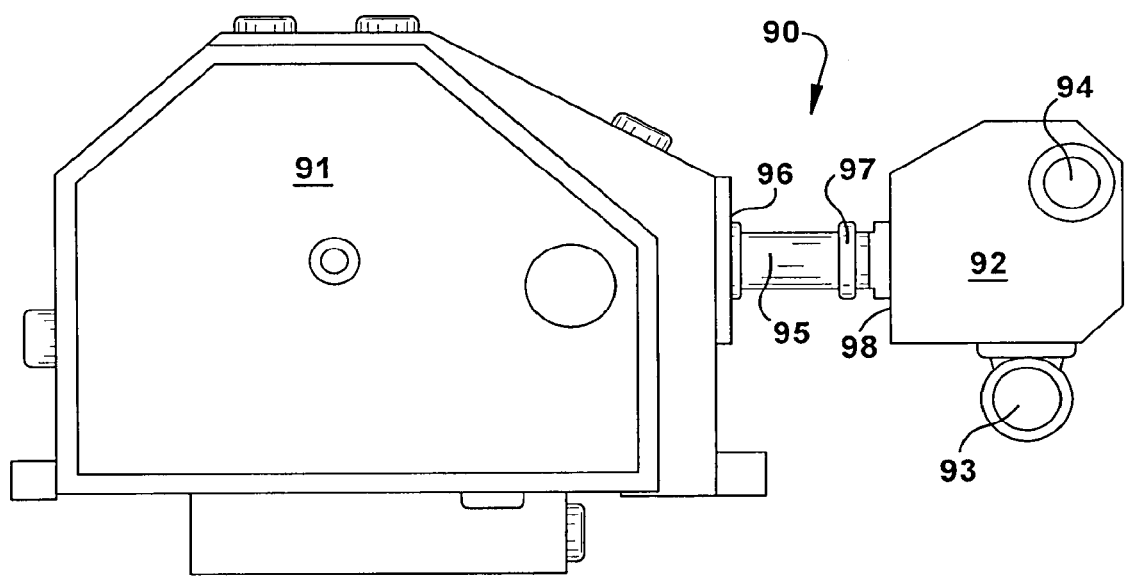
FIG. 5 is a perspective view of a mudpump wherein the seal is used to seal an interface associated with a pony rod and/or a plunger rod.

The reciprocating-rod assembly 80 can be part of a pump, such as the mudpump 90 shown in FIG. 5. The mudpump 90 comprises a power-providing station 91 and a pumping station 92 that work together to suction a working fluid (e.g., mud slurry) through an inlet 93 and discharges it through an outlet 94. The power-providing station 91 houses equipment (e.g., crank shaft, cross-heads, etc.) for reciprocal movement of pony rods 95 that extend through appropriate openings in the front panel 96 of the station's housing. The pumping station 92 houses a cylinder block for receipt of plungers, carried by plunger rods 97 extending through appropriate openings in a rear panel 98 of the station housing. The pony rods 95 and the plunger rods 97 interconnect between the stations 91 and 92, so that the plunger rods 93 are reciprocally driven by the pony rods 95. If the mudpump 90 has a triplex design, for example, it could have three pony rods 95 and three plunger rods 97.

The reciprocating rod assembly 80, and thus the seal 10, can be used in conjunction with the mudpump pony rods 95 and/or the mudpump plunger rods 97. In either or any case, a station panel 96/97 is the housing 81, a rod 95/97 is the reciprocating rod 82, and the seal 10 is positioned in a pocket 84 around the rod-receiving opening in the housing 81. With the seal 10 so positioned in the mudpump 90, it is easily accessible for installation, inspection or replacement. Furthermore, it can serve as the only seal on the relevant rod 95/97 whereby buffer rings and/or supplemental seals within the housing are not necessary. In other words, the seal 10 can be the primary seal on the mudpump's reciprocating rod assembly 80.

Although the seal 10, the rigid support 20, the elastomeric body 30, the mold 70, the assembly 80, the mudpump 90, and other related components, elements, methods, and steps, have been shown and described with respect to certain embodiments, it is obvious that equivalent alterations and modifications will occur to others skilled in the art upon the reading and understanding of this specification and the annexed drawings. In regard to the various functions performed by the above described elements (e.g., components, assemblies, systems, steps, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature may have been described above with respect to only one or more of several illustrated embodiments, such feature may be combined with one or more other features of the other embodiments, as may be desired and advantageous for any given or particular application.

Then invention claimed is:

1. A reciprocating-rod seal comprising a one-piece rigid support and a one-piece elastomeric body bonded thereto; wherein:
   the rigid support comprises a cylindrical retaining wall forming an OD surface of the seal, the cylindrical retaining wall having a hinged fluidside end section;
   the elastomeric body comprises:
      an OD face encased by the cylindrical retaining wall whereby the elastomeric body does not extend axially or radially beyond the retaining wall,
      an ID face forming the ID surface of the seal,
      a fluidside face forming the fluidside surface of the seal and having a notch formed therein, and
      an airside face at least partially forming the airside surface of the seal and having a groove formed therein;
   the notch separates an ID fluidside portion of the elastomeric body from an OD fluidside portion of the elastomeric body, and the ID fluidside portion forms a sealing lip;
   the groove separates an ID airside portion of the elastomeric body from an OD airside portion of the elastomeric body, and the ID airside portion forms a wiping lip; and
   the hinged fluidside end section abuts the OD fluidside portion of the elastomeric body to bound the OD fluidside portion opposite the notch, the hinged fluidside end section having a thickness that is less than a thickness of the retaining wall, the hinged fluidside end section being bent radially inwardly from an outermost portion of the cylindrical retaining wall, wherein the hinged fluidside end section includes a straight outermost edge that extends radially inwardly from the outermost portion of the cylindrical retaining wall and forms a sharp corner that is exposed relative to the elastomeric body.

2. A reciprocating-rod seal as set forth in claim 1, wherein the rigid support also comprises a flange wall extending radially inward from an airside end of the cylindrical retaining wall.

3. A reciprocating-rod seal as set forth in claim 2, wherein a region of the airside face of the elastomeric body is encased by the flange wall.

4. A reciprocating-rod seal as set forth in claim 2, wherein the rigid support comprises an anchor wall extending axially from an ID end of the flange wall.

5. A reciprocating-rod seal as set forth in claim 4, wherein at least a part of the OD airside portion of the elastomeric body occupies a space defined within the flange wall and the anchor wall of the rigid support.

6. A reciprocating-rod seal as set forth in claim 3, wherein the flange wall of the rigid support and the airside face of the elastomeric body form the airside surface of the seal.

7. A reciprocating-rod seal as set forth in claim 1, wherein the sealing lip applies more rod-contact forces than the wiping lip.

8. A reciprocating-rod seal as set forth in claim 1, wherein the hinged fluidside end section is crimped.

9. A reciprocating-rod seal as set forth in claim 1, wherein the rigid support is made of metal.

10. A reciprocating-rod seal as set forth in claim 1, wherein the elastomeric body is made from polyurethane.

11. A reciprocating-rod seal as set forth in claim 1, further comprising a separate reinforcement member positioned within the groove in the airside face of the elastomeric body.

12. A reciprocating-rod seal as set forth in claim 1, wherein the ID face of the elastomeric body comprises a fluidside ramp region forming the rod-contacting area of the sealing lip and an airside ramp region forming the rod-contacting area of the wiping lip.

13. A reciprocating-rod seal as set forth in claim 12, wherein the ID face of the elastomeric body comprises a shallow between the ramp regions that is not a rod-contacting area.

14. A reciprocating-rod seal as set forth in claim 1, wherein the rigid support is made of metal and the elastomeric body is made of polyurethane, and wherein:
the rigid support further comprises a flange wall extending radially inward from an airside end of the retaining wall and an anchor wall extending in the fluidside direction from an ID end of the flange wall,
the flange wall and the airside face of the elastomeric body form the airside surface of the seal,
the anchor wall is embedded in the OD airside portion of the elastomeric body,
the ID face of the elastomeric body comprises a intermediate region that is not a rod-contacting area, and
the sealing lip applies more rod-contact forces than the wiping lip.

15. A method of making the reciprocating-rod seal set forth in claim 1 with a mold having a cavity formed by a first mold part having a channel corresponding to the seal's airside face and groove-forming projection, a second mold part having a channel corresponding to the seal's fluidside face and notch-forming projection, and a core mold part having a perimeter corresponding to the seal's ID face;
said method comprising the step of:
placing the rigid retainer in the channel of the first mold part;
compiling the mold parts to close the mold cavity; and
introducing elastomer into the closed mold cavity;
wherein the rigid retainer prevents the elastomer from flowing axially or radially beyond the retaining wall in the mold cavity, and
wherein the hinged fluidside end section is bent radially inwardly.

16. A reciprocating-rod assembly comprising a housing, a rod that reciprocally moves relative to the housing, and the seal set forth in claim 1; wherein:
the housing comprise an opening through which the rod extends and pocket surrounding the opening;
the seal is installed in the pocket and its retaining wall abuts against the floor of the pocket and OD fluidside portion lies flush against the ledge of the pocket;
the ID fluidside portion and the ID airside portion of the elastomeric body are compressed;
the sealing lip slidingly contacts the rod to prevent fluid escape from the housing during forward and return strokes of the rod, and
the wiping lip sliding contacts the rod to wipe the rod clean during return strokes.

17. A pump comprising the reciprocating rod assembly set forth in claim 16, wherein the rod is a pony rod and/or a plunger rod that is reciprocally moved to suction and discharge a working fluid.

18. A pump as set forth in claim 17, wherein the working fluid is mud slurry whereby the pump is a mudpump.

19. A pump as set forth in claim 17, wherein the seal is the only seal on the reciprocating rod.

20. A reciprocating-rod seal comprising a one-piece rigid support and a one-piece elastomeric body bonded thereto; wherein:
the rigid support comprises an anchor wall and a cylindrical retaining wall forming an OD surface of the seal, the cylindrical retaining wall having a hinged fluidside end secion, the hinged fluidside end section being bent radially inwardly from an outermost portion of the cylindrical retaining wall, the hinged fluidside end section having a straight outermost edge that extends radially inwardly from the outermost portion of the cylindrical retaining wall and forms a sharp corner that is exposed relative to the elastomeric body;
the elastomeric body comprises:
an OD face encased by the cylindrical retaining wall whereby the elastomeric body does not extend axially or radially beyond the retaining wall,
an ID face forming the ID surface of the seal,
a fluidside face forming the fluidside surface of the seal and having a notch formed therein, and
an airside face at least partially forming the airside surface of the seal and having a groove formed therein;
the notch separates an ID fluidside portion of the elastomeric body from an OD fluidside portion of the elastomeric body, and the ID fluidside portion forms a sealing lip;
the groove separates an ID airside portion of the elastomeric body from an OD airside portion of the elastomeric body, and the ID airside portion forms a wiping lip; and
wherein the anchor wall has a first wall portion that extends along the elastomeric body towards the ID airside portion and a second wall portion that is embedded in the OD airside portion, the second wall portion extending from the first wall portion through the elastomeric body and towards the OD fluidside portion of the elastomeric body.

* * * * *